Feb. 28, 1967        D. R. PETERSON        3,306,768
METHOD OF FORMING THIN OXIDE FILMS
Filed Jan. 8, 1964        3 Sheets-Sheet 1

INVENTOR.
David R. Peterson
BY
Mueller & Aichele
ATTY'S.

Feb. 28, 1967 D. R. PETERSON 3,306,768
METHOD OF FORMING THIN OXIDE FILMS
Filed Jan. 8, 1964 3 Sheets-Sheet 3

INVENTOR.
David R. Peterson
BY
Mueller & Aichele
ATTY'S.

United States Patent Office 3,306,768
Patented Feb. 28, 1967

3,306,768
METHOD OF FORMING THIN OXIDE FILMS
David Ralph Peterson, Phoenix, Ariz., assignor to Motorola, Inc., Chicago, Ill., a corporation of Illinois
Filed Jan. 8, 1964, Ser. No. 339,060
6 Claims. (Cl. 117—106)

This application is a continuation-in-part of a copending application of David R. Peterson, Serial No. 195,630, filed May 17, 1962, now abandoned.

This invention relates generally to the vapor deposition of thin films. Particularly, the invention relates to the hydrolytic formation of thin substantially anhydrous oxide films on relatively cool substrates.

The preparation of solid thin films by a variety of techniques has steadily grown in importance. Among the most useful films are those of the metallic oxides. These oxide films find wide application and may be useful in many totally different ways; to mention just a few, solid metallic oxide films are used as anti-reflection coatings for optical devices, and for conduction, insulation, stabilization and encapsulation coatings for semiconductor, solid state, and other electronic devices. The specific applications that are possible are almost endless.

Many techniques for coating with oxides and mixtures of oxides have one or more disadvantages. Perhaps it may be difficult to form dense films. The oxides may be poorly adherent, uneven or discontinuous in form. For some purposes, the purity of the oxide may be inadequate, or the film may be excellent, but the method is difficult, or messy, or may require expensive equipment. A very common disadvantage is that of having to heat to rather high temperatures the substrate on which the oxide film is to be formed; this limits the process to substrate materials not adversely affected by these temperatures.

Among the generally useful oxide coating precedures is to spray a hot substrate with an atomized water solution of a hydrolysable substance, usually a metallic halide salt. The oxide of the same metal is formed on the substrate as a product of a hydrolysis reaction. Heat is necessary to this procedure and one of its disadvantages for some applications is that the substrate is heated to a high temperature to obtain a good oxide.

Other hydrolytic methods include exposure of a substrate to metallic halide vapor in the presence of vapor phase water to form an oxide film. Generally where such films have been prepared at low temperatures, they tend to be of the hydrated type. Oxides containing a substantial percentage of water of hydration are poorly suited for some applications, e.g., hydrated silica is an inferior dielectric, the constants of which vary with age and the degree of hydration whereas the anhydrous form is an excellent and stable dielectric material. Aluminum oxide and titanium dioxide are similar to silica in this respect. Also hydrated films, especially when affixed to a rigid substrate, when dried exhibit some shrinkage which often results in crazing of the film so that it is no longer continuous.

Pyrolytic methods are useful and good films may be formed with them. The procedure here is to bring the vapor of a material that will decompose on heating (into usually volatile products and the desired oxide) into contact with a heated substrate. Excellent oxide films may be formed on suitable substrates by pyrolysis, but the desired substrates must be able to survive the temperatures involved or the method cannot be used.

A very simple method is to evaporate metals in a heated oxidizing atmosphere to form oxide vapors and then condense them on the substrate. This method cannot easily be used if at all for some oxides and generally where used the substrate temperatures are rather high. Here again predominating high substrate temperature requirements limit the use of the method.

There are many other methods which are similarly limited, but there are fewer whereby adherent oxide films may be formed on unheated or moderately hot substrates. The better known methods include vacuum evaporation, cathodic sputtering and anodizing.

As mentioned, vacuum evaporation techniques may be used for depositing thin films of certain oxides or mixtures of oxides on unheated or moderately heated substrates, and the general procedure is to vaporize an oxide evaporant in a chamber under high vacuum conditions. Much of the evaporated material, by virtue of the vacuum, impinges directly upon the substrate and forms the film on it. However, with vacuum evaporation, it has not been possible in most cases to deposit metal oxide films in their highest oxidation states. This is due to chemical reactions which may take place at the high evaporation temperatures between the oxide evaporant, the material of the heater used to vaporize the evaporant, or the residual gases in the vacuum chamber. The decomposition of a metal oxide to a lower oxidation state may be caused by these reactions or in some cases by the fact that the oxygen pressure during evaporation may be lower than is required for their stable existence. Also, films may be contaminated with pump oil products or volatile oxides of the evaporation heaters unless special precautions are taken. There is a problem when evaporating the lower oxides that the state of oxidation of the evaporated film may also be greater than that of the evaporant. This is due to reaction with oxygen or moisture in the chamber. A result of these reactions is that the film consists of more than one oxide of the metal. It is apparent that while high substrate temperatures are not required, vacuum evaporation is not an especially good method for oxide film deposition.

Cathodic sputtering is an old and useful technique for depositing many things including metallic oxides. A sputtered metallic oxide deposition onto a substrate is usually done by bombarding a metal cathode with glow discharge ionized gas particles in a low pressure oxygen-inert gas atmosphere. The metal cathode is slowly disintegrated by the bombardment and the metal is deposited as its oxide on the substrate. A disadvantage of this method is that materials other than the cathode may be disintegrated and deposited so the thin film may lack purity. Special care must be used with certain substrates, especially those where surface characteristics are very important. Semiconductors, for example, may be altered by this treatment as glow discharge can disturb near-surface structure to a slight depth.

The formation of oxide films by making a metal or its film on a substrate the anode in a suitable electrolyte is known as anodizing. Anodizing is suited to only a few metals, notably aluminum, magnesium and tantalum, and the unhydrated oxides formed by anodizing are porous. The films are not pure due to electrolyte penetration.

An especially valuable thin film process would be one which provides a means of forming highly adherent thin films of high purity metallic oxides in a manner in which the substrates on which the films are formed may be maintained at moderate temperatures. With regard to this invention, a moderate temperature range might conveniently be between 20° C. and 200° C., and a moderate temperature would then be a given particular temperature within this range.

Accordingly, there are several objects of this invention, the first of which is to provide an improved method of forming highly adherent metallic oxide thin films on suitable substrates.

Another object of the invention is to provide an improved method of forming highly pure thin films of metallic oxide.

In case it is desirable to form a metallic oxide film of other than one metal, it is an object of this invention to provide an improved method of forming a film of mixed oxides of different metals and of controlled composition.

A further object of the invention is to provide an improved means of forming highly adherent and pure thin films of substantially anhydrous metallic oxide under conditions where the substrate is held at a suitable moderate temperature. Expressed differently, it is an object of the invention to provide the kind of oxiding process where substrate temperature requirements are minimal with respect to the process itself.

A feature of this invention is a means of causing hydrolysis of metal halide vapors at the surface of a suitable substrate by utilizing its adsorbed moisture to provide the water for hydrolysing metal halides into metallic oxides. This provision causes a highly adherent oxide film to form on the surface of the substrate and since the hydrolysis products are just the oxide and a volatile hydrogen halide, the film has high purity.

Another feature of the invention permits uninterrupted film growth as long as desired by replenishing the adsorbed moisture on the substrate as it is used up in hydrolysing the halide.

Another feature of the invention is the provision of a method of controlling the ratio of water vapor to metal halide so that the ratio of halide to water is large, thereby assuring the formation of a substantially anhydrous oxide film.

It is an important feature of the invention that the energy for the hydrolysis at the substrate surface is provided in a manner that does not, by ordinary measurement, raise the substrate temperature, and also permits this hydrolysis to occur at a moderate substrate temperature.

In accordance with this invention, thin oxide films may be caused to form on suitable substrates in the manner to be summarily described. A substrate should be construed to mean any suitable item or part on which a thin oxide film may be caused to form.

A clean substrate is exposed to the vapor of a halide of a metal. There is adsorbed water present on the substrate, and the halide is hydrolyzed by it to form an oxide of the metal on the substrate surface. The adsorbed moisture is replenished as used by exposing the substrate to vapor phase water as well as the halide. The substrate temperature is only moderate so an additional part of the necessary energy for the hydrolysis may be provided by heating the halide vapor away from the substrate surface. The maintenance of the moderate substrate temperature is aided by the use of a temperature controlled substrate heater, by heating halide and water vapor a distance away from the substrate, by control of the flow rates of these vapors, and by ordinary thermal loss by conduction, convection and radiation. For some applications, neither the substrate nor the vapors need be heated.

Also in accordance with this invention, mixed oxides may also be formed. The process is the same as just described except that the substrate is exposed at the same time to halides of more than one metal.

The accompanying drawings and the following text detail this invention.

Figure 1:
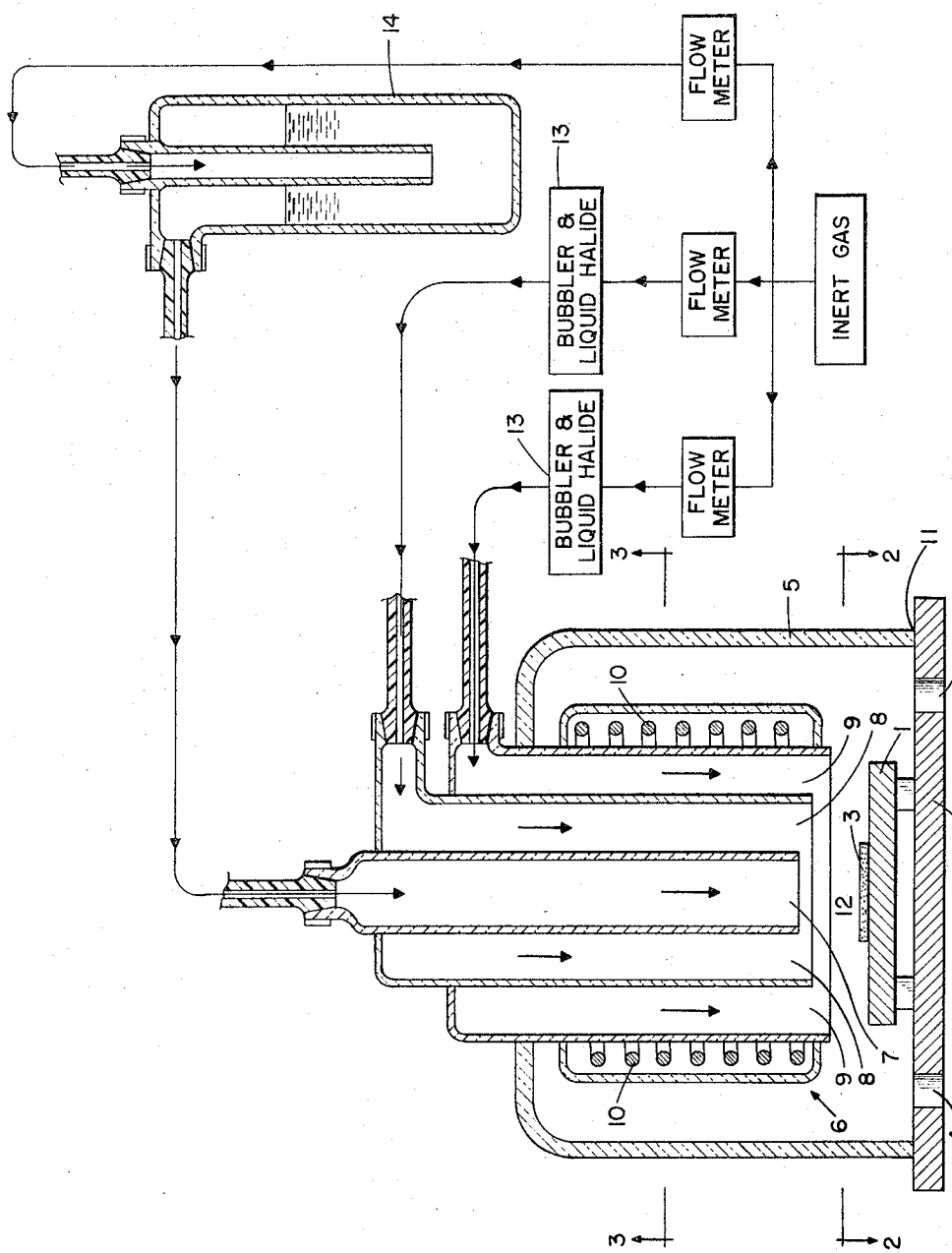
FIG. 1 is a schematic drawing of a sectional view of an oxide coating apparatus of this invention and its chemical sources.

FIG. 1 is a schematic drawing of the oxiding apparatus of this invention and consists of two major assemblies separable from one another.

Figure 2:
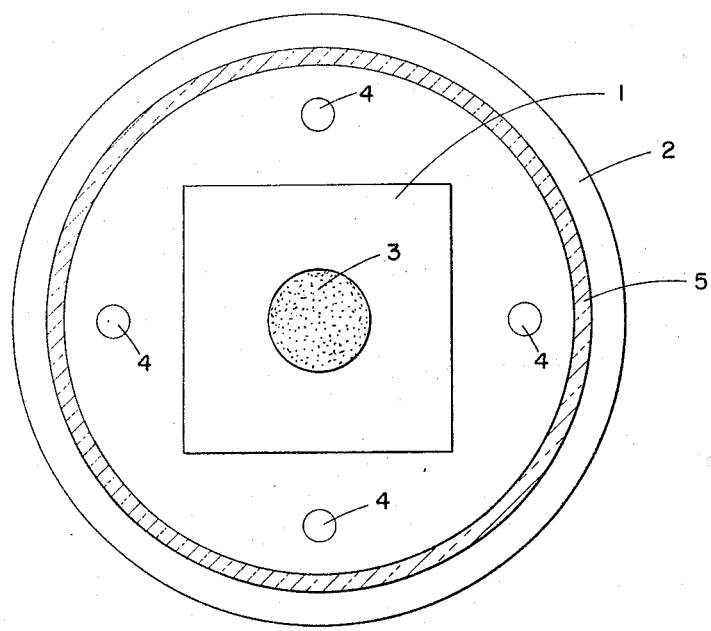
FIG. 2 is a top view of part of a base assembly included in the apparatus of FIG. 1.

The first is the base assembly consisting of a substrate plate 1 mounted on a base plate 2. The substrate plate which serves as a rest or support for the substrate 3 during oxiding is equipped so that it may be heated and the temperature controlled. The base plate has holes 4 through it which are exit ports for excess gas and vapor. FIG. 2 is an illustrative view of this assembly from the top.

Figure 3:
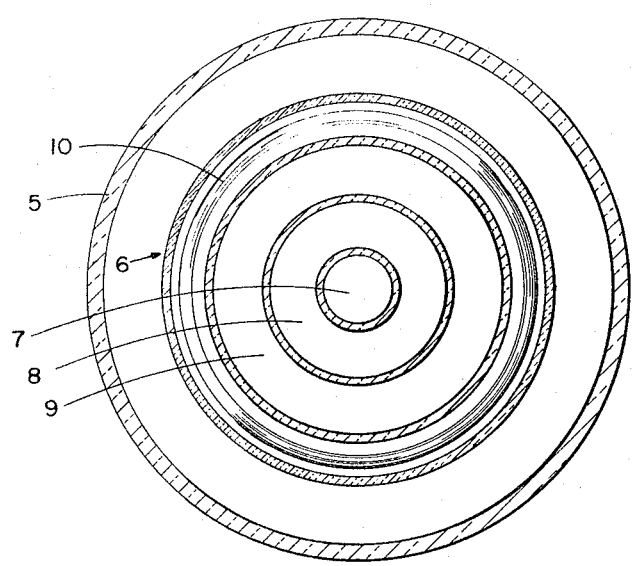
FIG. 3 is a view of part of the apparatus to be known as a bell housing assembly. For illustrative purposes, this view is from the bottom.

The second assembly is the bell housing assembly consisting of the bell housing 5 to which is attached a heating unit 6 for heating incoming gases and vapors. This is a temperature controlled unit made up of three coaxial tubes 7, 8 and 9 with a resistance heater 10 coiled around the outer tube. Gases and vapors are heated by flowing them through the heated coaxial tubes. FIG. 3 is an illustrative view of this assembly looking into the bell housing from the bottom.

The bell housing 5 rests on the base plate 2 during oxiding. The contacting surfaces 11 may be suitably finished or gasketed to seal against leakage. The bell housing assembly may be raised for easy access to the substrate plate 1 and other parts within the apparatus.

In FIG. 1 a clean substrate 3 rests upon the substrate plate 1. The temperature controlled plate is in thermal contact with the substrate and maintains it at a desired temperature. This particular temperature will usually lie between 20° C. and 200° C.

The exit ends of the coaxial tubes 7, 8 and 9 for heating gases and vapors are near and directly over the substrate 3. The space between the tube ends and the substrate serves as a mixing chamber 12 for the vapors and gases. The mixing chamber temperature usually is held at a temperature below 300° C., although this is variable depending on the materials.

A metallic halide vapor is brought into the apparatus with an inert carrier gas. If the halide is a liquid, an ordinary heated laboratory bubbler 13 may be employed to saturate the gas by bubbling the gas through the halide. Volatile solid halides are heated with the inert carrier gas sweeping over them in order to obtain a similar result. The gas and halide vapor are introduced into the apparatus through one of the two outer tubes 8 or 9. There are two tubes for halides so that the oxides of more than one metal may be formed. In this case, a different metal halide vapor is introduced through each of the outer tubes.

Moisture in the form of water vapor is also brought into the apparatus with the aid of an inert carrier gas. The gas is passed through a water filled bubbler in order to saturate it with water vapor. The water vapor saturated gas is introduced into the apparatus through the central tube 7. The function of the incoming moisture is to replenish adsorbed moisture on the substrate as it is used up in the reaction. Replenishing the adsorbed moisture in this manner permits the film to be formed without interruption.

The film forming reaction occurring at the substrate surface is a reaction between the vapor of the metallic halide and the adsorbed moisture. The reaction is a simple hydrolysis of which silicon tetrachloride hydrolysing to form silicon dioxide is typical:

$$SiCl_4 + 2H_2O \rightarrow SiO_2 + 4HCl$$

Energy must be provided for the hydrolysis to occur. As the substrate is maintained at just a moderate temperature, at least part of the energy must come from somewhere else. The halide vapor is heated for this reason. A little of the total kinetic energy of the halide vapor becomes locally available for hydrolysis where vapor particles collide with the surface. The surface environment also favors the reaction and permits a faster reaction rate, under proper conditions, at the substrate than will occur in the mixing chamber region. In a properly controlled process, the reaction takes place principally at the exposed substrate surface. One of the reasons is that normally the volume concentration of water at the surface, due to the fact that it is adsorbed, is much greater than is the case in the mixing chamber; thus, the probability of a halide particle making contact with water is greater at the substrate surface than in the mixing chamber region.

If the ratio of the amount of hydrolysis occurring in the mixing chamber to the amount occurring on the substrate is too high, the oxide on the substrate is found to be hydrated, poorly adherent and of a powdery nature. This ratio may be minimized by keeping the exit ends of the coaxial tubes of the gas heating unit close to the substrate.

substrate is decreased so that the surface reaction rate is also decreased; this means that a greater percentage of the total hydrolysis will occur in the mixing chamber to the detriment of the film quality.

The following table (Table 1) shows the maximum, minimum and optimum mixing chamber and substrate temperatures for four typical substantially anhydrous metallic oxides. The apparatus used was the oxide coating apparatus of FIG. 1. Of the physical data tabulated, only the ratio of halide to water, the mixing chamber temperature and the substrate temperature are considered essential. Except where otherwise noted the carrier gas used was argon. The deposition rates in the last column are based on the use of the typical temperatures and flow rates; in all cases the substrate was a wafer of fused quartz having a deposition surface of approximately one square inch.

TABLE 1

| Oxide Formed | Halide | Minimum Ratio Halide Water | Typical Mixing Chamber Temp., °C. | Range Mixing Chamber Temp., °C. | Typical Substrate Temp., °C. | Range Substrate Temp., °C. | Typical Halide Bubbler or Source Temp., °C. | Typical Water Bubbler or Source Temp., °C. | Typical Carrier Gas Flow (Halide), ml./min. | Typical Carrier Gas Flow (Water), ml./min. | Typical Deposition Rate, A/min. |
|---|---|---|---|---|---|---|---|---|---|---|---|
| $SiO_2$ | $SiCl_4$ | 10:1 | 100 | 20 to 200 | 110 | 20 to 150 | 25 | 40 | 140 | 105 | 600 |
| $Al_2O_3$ | $Al_2Cl_6$ | 10:1 | 200 | 200 to 250 | 180 | 20 to 200 | 200 | (1) | 300 | | 100 to 300 |
| $TiO_2$ | $TiCl_4$ | 5:1 | 100 | 20 to 200 | 150 | 20 to 200 | 25 | 25 | 140 | 50 | 1,000 |
| $SnO_2$ | $SnCl_4$ | 10:1 | 175 | 20 to 200 | 175 | 20 to 200 | 25 | 25 | 150 | 100 | 50 |
| $SiO_2.nAl_2O_3$ | $SiO_2$ plus $nAl_2Cl_6$. | 10:1 | 200 | 200 to 250 | 300 | 20 to 350 | (2) | 25 | 150 and 150 | 100 | 500 |

[1] Air at 20%; relative humidity at 25° C.   [2] 25 ($SiCl_4$); 200 ($Al_2Cl_6$).

TABLE 2

| Film | $SiO_2$ | $Al_2O_3$ | $TiO_2$ | $SiO_2.Al_2O_3$ |
|---|---|---|---|---|
| Film Properties: | | | | |
| Dielectric Constant (approximate). | 6 | 10 | 100 | 10. |
| Dissipation Factor at 1 kc | .01 | .005 | .05 | .005. |
| D.C. Leakage amps at 10 v | $10^{-9}$ to $10^{-10}$ | $10^{-10}$ to $10^{-11}$ | $10^{-5}$ to $10^{-6}$ | $10^{-10}$ to $10^{-11}$. |
| Substrate | Fused Quartz | Fused Quartz | Fused Quartz | Fused Quartz. |
| Substrate Temp | 110° C | 160° C | 150° C | 160° C. |
| Halide Used | $SiCl_4$ | $Al_2Cl_3$ | $TiCl_4$ | $SiCl_4$ and $Al_2Cl_6$. |
| Halide Temp | 200° C | 200° C | 200° C | 200° C. |
| Argon flow into halide bubbler in in.³/min. | 10 | 10 | 10 | 20 and 5. |
| Argon flow into water bubbler in in.³/min. | 5 | 0.5 | 5 | 15. |

In effect, one of the walls of the mixing chamber is the substrate surface and so there is an even greater chance of the halide contacting adsorbed water than water vapor when the coaxial tube to substrate (wall to wall) distance is kept short. For the apparatus described, one half inch to three fourths inch gives good results. It is important to keep the flow rate of the halide gas stream much greater than that of the water vapor gas stream. This excess of halide means that most of the collisions of the particles (disregarding the carrier gases) occurring in the mixing chamber will be halide to halide rather than halide to water. Due to adsorption, there will be plenty of water at the substrate surface for hydrolysis. This procedure, which limits the mixing chamber hydrolysis, should be observed to prevent the powdery deposits previously mentioned. The greater the excess of halide to water, the more anhydrous is the oxide.

Powdery but not necessarily hydrated oxide films may also be caused by getting the substrate too hot. In this case, the concentration of moisture at the surface of the These films (Table 2) are clear and show glass-like fracture when scratched. X-ray diffraction has shown them to be non-crystalline. They are not affected by immersion in strong mineral acids.

Figure 4:
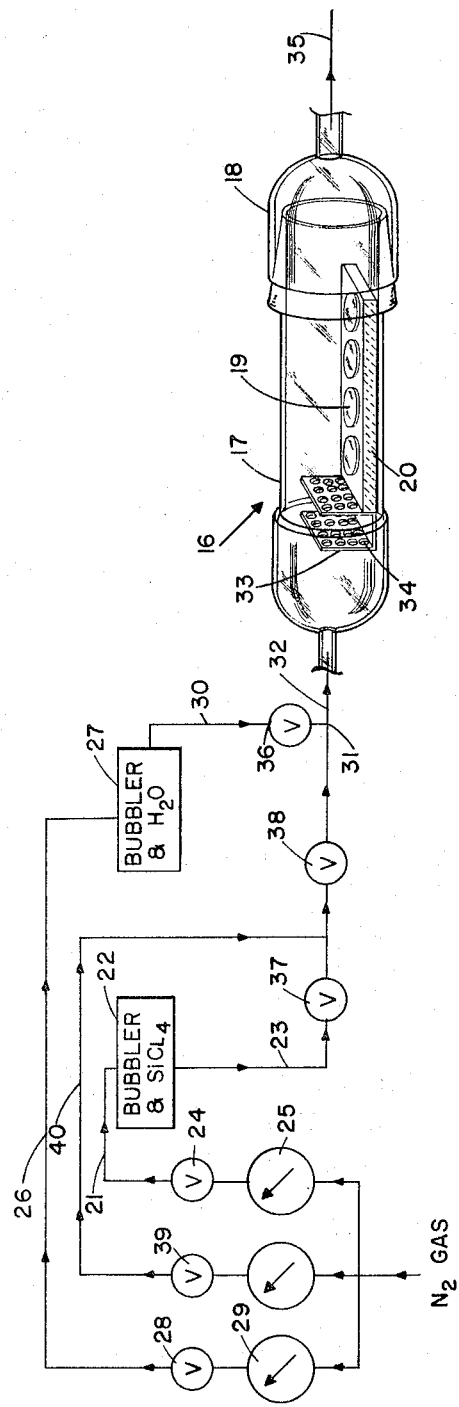
FIG. 4 is a schematic drawing of a special purpose oxide coating apparatus used for very thin silicon dioxide films.

FIG. 4 represents an oxide coating apparatus of a type that was developed for forming very thin films of $SiO_2$ on germanium substrates. The apparatus and method of use are cited here as a specific embodiment of the invention for the formation of these films on germanium, but it is probable that this basic apparatus could be used or adapted for other oxides and substrates. The rate of film growth using this apparatus is relatively slow but since the required $SiO_2$ films are very thin, they may be grown in a reasonably short period of time.

The deposition chamber 16 of FIG. 4 consists of a glass deposition tube 17 sealed at one end with a glass end bell 18. The deposition chamber is shown with germanium wafers 19 in position for oxidizing by the method of this invention. The end bell 18 is separable from the deposition tube 17 so that germanium 19 and the Teflon plate 20 on which it rests may be conveniently removed and replaced as required.

When the apparatus is being operated, nitrogen flows through the gas line 21 and into bubbler 22 where it becomes saturated by bubbling through silicon tetrachloride. The saturated gas flows into another line 23. The flow rate is controlled by the valve 24 and is indicated by the flow meter 25.

Concurrently, another stream of nitrogen flows through line 26 and into another bubbler 27 containing water where it becomes saturated with moisture. Flow is also controlled with a valve 28 and flow meter 29. The wet gas flows into another line 30.

The two saturated gas streams meet at the junction 31 where they mix in the short section of line 32 and flow into the vapor entrance end of the deposition chamber 16.

The mixed stream of saturated gas is interrupted with a set of baffles 33 perforated with small holes 34. The baffles and holes cause a more diffused flow of gaseous material within the deposition chamber and this increases film uniformity.

The gaseous material flows over the germanium wafers 19 and thin $SiO_2$ films are formed by hydrolysis of the $SiCl_4$ by adsorbed water on the surfaces of the wafers. The adsorbed water is replenished as used by water carried in by the nitrogen.

The waste gaseous material leaves the deposition chamber 16 through the attached exit line 35. The exit line is for transferring this material for disposal.

It has been found that there is more uniformity of the films if the deposition chamber is purged of air before each use. The method for doing this is to flush the deposition chamber by closing suitable valves 24, 28, 36 and 37 and having other valves 38 and 39 open so that nitrogen flows through the purge line 40 and deposition chamber.

The following paragraphs of procedural data was gathered using an apparatus with a deposition chamber 16 of about twelve inches in length and with a nominal inside diameter of about two inches. Baffling consisted of two thin molybdenum baffles 33 placed perpendicularly to the long axis of the deposition chamber. The two baffles were formed by bending up the ends of a single piece of perforated metal so that there was about 1½ inch separation between the baffles. The holes across all of the baffle surface were about ⅛ inch in diameter on ¼ inch centers.

To operate a similar apparatus, valves are first set for purging so that approximately 2 cubic feet per hour of nitrogen is flowing through the deposition chamber 16. The deposition chamber is opened by detaching the end bell 18 and the Teflon plate 20 is removed from inside the deposition tube 17. The Teflon plate 20, of approximate dimensions ¼" x 1¼" x 6", is loaded by placing clean germanium wafers 19 on it. The plate 20 with the germanium is put back into the deposition tube 17 and the end bell replaced. Since air enters the deposition chamber when the end bell is not in place, the flow of nitrogen is continued for 3 or 4 minutes to purge the apparatus.

After purging is complete and the nitrogen flow for this purpose has been valved off, the oxide growth is started. The $SiCl_4$ saturated and the water saturated gas streams are introduced into the deposition chamber by valving nitrogen into the bubblers 22 and 27 of $SiCl_4$ and of water. The flow of gas into the $SiCl_4$ bubbler 22 is about 1.3 cubic feet per hour and the flow into the water bubbler is about 0.9 cubic feet per hour.

The thickness of the $SiO_2$ film is estimated by watching the wafer and noting the color changes due to optical interference between light being reflected from the wafer surface and light being reflected from the film. The wafers are examined by observing them through the glass wall of the deposition tube 17 with the aid of a magnifying glass and good illumination until the color of the surface of the wafer denotes that the desired thickness of the $SiO_2$ film has been reached. In this embodiment, the desired thickness is 400 or 500 angstrom units and the color denoting this range is brown. This film takes about 20 minutes to form.

This apparatus is seldom used in growing $SiO_2$ films over 2000 angstrom units thick. A table of interference colors for thicknesses up to 2000 angstrom units is given below in Table 3.

TABLE 3

| Color: | Thickness—angstroms |
|---|---|
| Clear to grey | 200 |
| Grey to brown | 400 |
| Brown to purple | 800 |
| Purple to blue | 1400 |
| Blue to green | 1800 |
| Green to yellow | 2000 |

When the desired color is reached, the $SiCl_4$ saturated and water gas streams are valved off and purging is started again at 2 cubic feet per hour of nitrogen as before. After purging for 5 minutes, the end bell is taken off and the processed germanium wafers are removed from the deposition tube. This completes the oxide growth processing of these wafers.

It should be noted that the dimensional requirements cited for the mixing chamber of the apparatus shown in FIG. 1 are much less stringent with regard to the apparatus of FIG. 4. This is because there is much less of a tendency for vapor phase hydrolysis to occur as the low temperatures of the mixing gases do not favor the reaction. At low gas temperatures, although conditions existing at substrate surfaces are highly favorable to $SiO_2$ formation, it is probable that the halide vapor particles principally involved in the surface reaction are those having the higher kinetic energy; in general, as high energy halide particles impinge upon a moist surface, they tend to hydrolyze rapidly while the less energetic impinging halide particles contribute much less to the rate of oxide formation.

It is apparent that the invention described provides a means of forming highly adherent thin films of high purity metallic oxides in a manner requiring only moderate substrate temperatures. Of the many desirable characteristics of this process, the chief one is that substrate temperature requirements are nearly minimal.

I claim:

1. A process for coating a solid substrate with a substantially anhydrous oxide film while keeping the substrate at a relatively low temperature, said process including the steps of
    (a) forming first and second gas streams of specifically non-reactive gas selected from the group consisting or argon, helium, nitrogen, carbon dioxide and air,
    (b) introducing vapor phase water into said first gas stream to form a first gaseous mixture,
    (c) introducing into said second gas stream vapors of a hydrolysable halide of at least one element selected from the group consisting of titanium, silicon and aluminum to form a second gaseous mixture,
    (d) mixing said first and second gaseous mixtures with each other to form a third gaseous mixture having an excess of halide vapor to water vapor in the minimum molecular ratio of 5:1 for titanium halides, and 10:1 for others of said halides, said excess halide vapor promoting the formation of a substantially anhydrous oxide film,
    (e) and exposing said substrate to said third mixture while maintaining the substrate at a selected temperature no greater than 200° C. at which temperature water supplied from said mixed gases becomes adsorbed on the surface of the substrate and hydrolyzes said halide vapors supplied from said mixed gases at said substrate to form a film on said substrate comprised of an oxide of said selected element.

2. A process for coating a solid substrate with a substantially anhydrous silicon dioxide film, said process being performed in a reaction chamber and including the steps of concurrently
  (a) exposing a wafer of the substrate to vapor phase water in the reaction chamber, said vapor phase water being continuously introduced into the reaction chamber by mixing with a stream of specifically non-reacting gas selected from the group consisting of argon, helium, nitrogen, carbon dioxide and air, and allowing said gas stream to carry the vapor phase water into the reaction chamber, said gas stream and water vapor mixture having a mean temperature in the range of 20° C. to 200° C.,
  (b) maintaining said substrate at a temperature below 150° C. to promote the concentration of adsorbed water thereon, said adsorbed water supplied from the aforementioned vapor phase water,
  (c) exposing said substrate to heated vapor phase silicon tetrachloride in the reaction chamber, said vapor phase silicon tetrachloride being continuously introduced into the reaction chamber by mixing with a stream of specifically non-reacting gas selected from the group consisting of argon, helium, nitrogen, carbon dioxide and air, and allowing the gas stream to carry the vapor phase silicon tetrachloride into the reaction chamber, said gas stream and said silicon tetrachloride having a mean temperature in the range 20° C. to 200° C.,
  (d) controlling the relative amounts of silicon tetrachloride and water being introduced into said reaction chamber so that the amount of silicon tetrachloride is greater than the amount of said vapor phase water by a ratio of at least 10:1,
  (e) thereby coating said substrate by causing a substantially anhydrous silicon dioxide film to form thereon by hydrolytic reaction of the silicon tetrachloride with the adsorbed water on the substrate surface.

3. A process for coating a solid substrate with a substantially anhydrous aluminum oxide film, said process being performed in a reaction chamber and including the steps of concurrently
  (a) exposing a wafer of the substrate to vapor phase water in the reaction chamber, said vapor phase water being continuously introduced in the reaction chamber by mixing with a stream of specifically non-reacting gas selected from the group consisting of argon, helium, nitrogen, carbon dioxide and air, and allowing said gas stream to carry the vapor phase water into the reaction chamber, said gas stream and water vapor mixture having a mean temperature in the range of 200° C. to 250° C.,
  (b) maintaining said substrate at a temperature below 200° C. to promote the concentration of adsorbed water thereon, said adsorbed water supplied from the aforementioned vapor phase water,
  (c) exposing said substrate to heated vapor phase aluminum chloride in the reaction chamber, said vapor phase aluminum chloride being continuously introduced into the reaction chamber by mixing with a stream of specifically non-reacting gas selected from the group consisting of argon, helium, nitrogen, carbon dioxide and air, and allowing the gas stream to carry the vapor phase aluminum chloride into the reaction chamber, said gas stream and said aluminum chloride having a mean temperature in the range 200° C to 250° C.,
  (d) controlling the relative amounts of aluminum chloride and water being introduced into said reaction chamber so that the amount of aluminum chloride is greater than the amount of said vapor phase water by a ratio of at least 10:1,
  (e) thereby coating said substrate by causing a substantially anhydrous aluminum oxide film to form thereon by hydrolytic reaction of the aluminum chloride with the adsorbed water on the substrate surface.

4. A process for coating a solid substrate with a substantially anhydrous titanium dioxide film, said process being performed in a reaction chamber and including the steps of concurrently
  (a) exposing a wafer of the substrate to vapor phase water in the reaction chamber, said vapor phase water being continuously introduced into the reaction chamber by mixing with a stream of specifically non-reacting gas selected from the group consisting of argon, helium, nitrogen, carbon dioxide and air, and allowing said gas stream to carry the vapor phase water into the reaction chamber, said gas stream and water vapor mixture having a mean temperature in the range of 20° C. to 200° C.,
  (b) maintaining said substrate at a temperature below 200° C. to promote the concentration of adsorbed water thereon, said adsorbed water supplied from the aforementioned vapor phase water,
  (c) exposing said substrate to heated vapor phase titanium tetrachloride in the reaction chamber, said vapor phase titanium tetrachloride being continuously introduced into the reaction by mixing with a stream of specifically non-reacting gas selected from the group consisting of argon, helium, nitrogen, carbon dioxide and air, and allowing the gas stream to carry the vapor phase titanium tetrachloride into the reaction chamber, said gas stream and said titanium tetrachloride having a mean temperature in the range 20° C. to 200° C.,
  (d) controlling the relative amounts of titanium tetrachloride and water being introduced into said reaction chamber so that the amount of titanium tetrachloride is greater than the amount of said vapor phase water by a ratio of at least 5:1,
  (e) thereby coating said substrate by causing a substantially anhydrous titanium dioxide film to form thereon by hydrolytic reaction of the titanium tetrachloride with the adsorbed water on the substrate surface.

5. A process for coating a solid substrate with a substantially anhydrous tin dioxide film, said process being performed in a reaction chamber and including the steps of concurrently
  (a) exposing a wafer of the substrate to vapor phase water in the reaction chamber, said vapor phase water being continuously introduced into the reaction chamber by mixing with a stream of specifically non-reacting gas selected from the group consisting of argon, helium, nitrogen, carbon dioxide and air, and allowing said gas stream to carry the vapor phase water into the reaction chamber, said gas stream and water vapor mixture having a mean temperature in the range of 20° C. to 200° C.,
  (b) maintaining said substrate at a temperature below 200° C. to promote the concentration of adsorbed water thereon, said adsorbed water supplied from the aforementioned vapor phase water,
  (c) exposing said substrate to heated vapor phase tin tetrachloride in the reaction chamber, said vapor phase tin tetrachloride being continuously introduced into the reaction by mixing with a stream of specifically non-reacting gas selected from the group consisting or argon, helium, nitrogen, carbon dioxide and air and allowing the gas stream to carry the vapor phase tin tetrachloride into the reaction chamber, said gas stream and said tin tetrachloride having a mean temperature in the range 20° C. to 200° C.,
  (d) controlling the relative amounts of tin tetrachloride and water being introduced into said reaction chamber so that the amount of tin tetrachloride is greater than the amount of said vapor phase water by a ratio of at least 10:1,
  (e) thereby coating said substrate by causing a substantially anhydrous tin dioxide film to form thereon by hydrolytic reaction of the tin tetrachloride with the adsorbed water on the substrate surface.

6. A process for coating a solid substrate with a substantially anhydrous mixed oxide film of silicon and aluminum oxides, said process being performed in a reaction chamber and including the steps of concurrently
   (a) exposing a wafer of the substrate to vapor phase water in the reaction chamber, said vapor phase water being continuously introduced into the reaction chamber by mixing with a stream of specifically non-reacting gas selected from the group consisting of argon, helium, nitrogen, carbon dioxide and air, and allowing said gas stream to carry the vapor phase water into the reaction chamber, said gas stream and water vapor mixture having a mean temperature in the range of 200° C. to 250° C.,
   (b) maintaining said substrate at a temperature below 200° C. to promote the concentration of adsorbed water thereon, said adsorbed water supplied from the aforementioned vapor phase water,
   (c) exposing said substrate to a heated mixture of vapor phase silicon tetrachloride and vapor phase aluminum chloride in the reaction chamber, said silicon tetrachloride and aluminum chloride being continuously introduced into the reaction chamber by mixing with at least one stream of specifically non-reacting gas selected from the group consisting of argon, helium, nitrogen, carbon dioxide and air, and allowing the gas stream to carry said vapor phase silicon tetrachloride and said vapor phase aluminum chloride into the reaction chamber, said gas stream and said vapor phase silicon tetrachloride and said vapor phase aluminum chloride having a mean temperature in the range 200° C. to 250° C.,
   (d) controlling the amount of said vapor phase silicon tetrachloride and aluminum chloride mixture relative to water being introduced into said reaction chamber so that the amount of said mixture is greater than the amount of said vapor phase water by a ratio of at least 10:1,
   (e) thereby coating said substrate by causing a substantially anhydrous mixed oxide film of silicon and aluminum to form thereon by hydrolytic reaction of the silicon tetrachloride and aluminum chloride with the adsorbed water on the substrate surface.

References Cited by the Examiner
UNITED STATES PATENTS

| | | | |
|---|---|---|---|
| 2,375,482 | 5/1945 | Lyle | 117—106 |
| 2,478,817 | 8/1949 | Gaiser | 117—106 |
| 2,572,497 | 10/1951 | Law | 117—106 |
| 2,953,483 | 9/1960 | Torok | 117—106 |
| 2,967,113 | 1/1961 | Liebhafsky et al. | 117—106 |
| 3,067,071 | 12/1962 | Mutter | 117—200 X |
| 3,089,793 | 5/1963 | Jordan et al. | 117—201 X |
| 3,093,507 | 6/1963 | Lander et al. | 117—201 |
| 3,220,880 | 11/1965 | Feuersanjer | 117—106 |

ALFRED L. LEAVITT, *Primary Examiner.*

R. S. KENDALL, *Examiner.*